(12) United States Patent
Stawikowski et al.

(10) Patent No.: US 7,366,752 B2
(45) Date of Patent: *Apr. 29, 2008

(54) COMMUNICATION SYSTEM OF AN AUTOMATION EQUIPMENT BASED ON THE SOAP PROTOCOL

(75) Inventors: Jean-Marie Stawikowski, Antibes (FR); Christian Hardy, Le Thoronet (FR)

(73) Assignee: Schneider Automation, Valbonne (FR)

( * ) Notice: Subject to any disclaimer, the term of this patent is extended or adjusted under 35 U.S.C. 154(b) by 1333 days.

This patent is subject to a terminal disclaimer.

(21) Appl. No.: 09/940,462

(22) Filed: Aug. 29, 2001

(65) Prior Publication Data

US 2002/0046239 A1 Apr. 18, 2002

(30) Foreign Application Priority Data

Aug. 31, 2000 (FR) .................................. 00 11320

(51) Int. Cl.
*G06F 15/16* (2006.01)
(52) U.S. Cl. .................. 709/202; 709/218; 709/220; 709/223; 700/95; 700/275
(58) Field of Classification Search .................. 707/2, 707/10; 709/200, 217
See application file for complete search history.

(56) References Cited

U.S. PATENT DOCUMENTS

| | | | |
|---|---|---|---|
| 5,367,520 A | 11/1994 | Cordell | |
| 6,457,066 B1 * | 9/2002 | Mein et al. | 719/330 |
| 6,591,260 B1 * | 7/2003 | Schwarzhoff et al. | 707/2 |
| 6,732,175 B1 * | 5/2004 | Abjanic | 709/227 |
| 6,732,191 B1 * | 5/2004 | Baker et al. | 710/1 |
| 7,085,814 B1 * | 8/2006 | Gandhi et al. | 709/208 |
| 2002/0032790 A1 * | 3/2002 | Linderman | 709/230 |

FOREIGN PATENT DOCUMENTS

| | | |
|---|---|---|
| WO | WO99/13418 | 3/1999 |
| WO | WO99/63409 | 12/1999 |

OTHER PUBLICATIONS

"Web Services and the SOAP Toolkit for Visual Studio 6.0", Microsoft, May 2000.*
"Frequently Asked Questions", Microsoft, Apr. 2000.*
"Frequently Asked Questions about XML", Jun. 2000.*
Don Box, et al., "Simple Object Access Protocol (SOAP) 1.1", XP-002163943, W3C Note, May 8, 2000, 28 pages.

* cited by examiner

*Primary Examiner*—Bunjob Jaroenchonwanit
*Assistant Examiner*—Dohm Chankong
(74) *Attorney, Agent, or Firm*—Oblon, Spivak, McClelland, Maier & Neustadt, P.C.

(57) ABSTRACT

A communication system on an IP network between an automation equipment and one or more remote devices. The communication system is based on the Simple Object Access Protocol (SOAP) for the. purpose of providing the remote device with automation equipment supervision, display, control, configuration or programming functions. The automation equipment comprises at least one WEB service and/or one WEB client able to interact with a program of the automation equipment, capable of decoding messages received from the IP network encoded according to the SOAP protocol and capable of encoding messages to be sent according to the SOAP protocol. A service description document, accessible to a remote device describes the capacities of one or more WEB services implanted in an automation equipment. This document may be stored or constructed dynamically by a generator.

20 Claims, 3 Drawing Sheets

COMMUNICATION SYSTEM OF AN AUTOMATION EQUIPMENT BASED ON THE SOAP PROTOCOL

Figure 1:
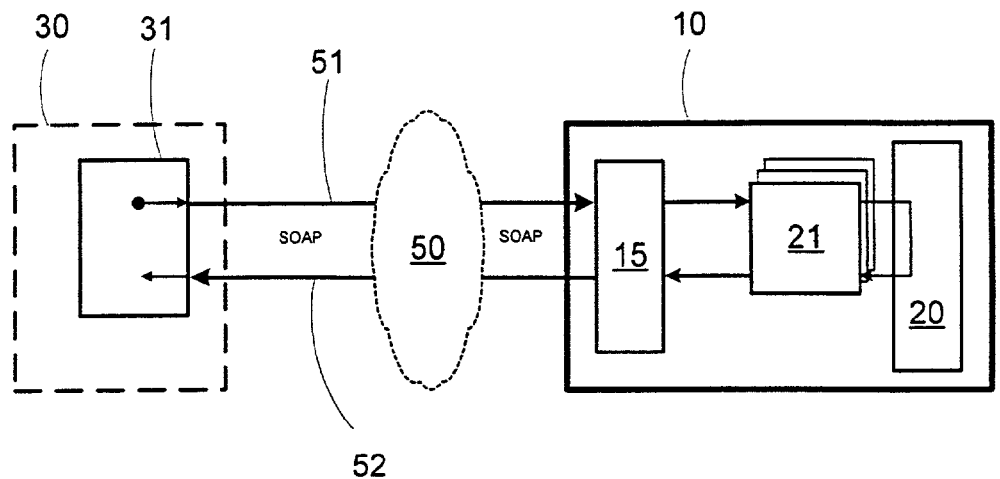

The present invention concerns a communication system on a global network of the Internet, Intranet or Extranet type, between at least one automation equipment offering one or more automatic control functions and at least one remote device, allowing the Simple Object Access Protocol (SOAP) to be used in an automation equipment, by means of at least one WEB service and/or one WEB client able to interact with a program of the automation equipment. The present invention also concerns a communication process based on this communication system and an automation equipment capable of implementing this communication system and process. Such a communication system may apply to any automatic control application belonging to the area of process automation, automatic controls in construction or in the control of electrical distribution networks.

By the term "automation equipment" will be hereinafter denoted a programmable logic controller, a digital control, a monitoring/control station but also any automatic control device or module having at least one processing unit, capable of being connected to an IP network as defined in the following paragraph, and capable of running a program to offer one or more automation functions in an automatic control application. For example, in this definition will be included a dedicated module or an input/output module of a programmable logic controller, a conversational terminal, a speed controller, etc.

It is known that such an automation equipment may be incorporated into a WEB server so as to be able to exchange data relating to this automation equipment with a remote WEB client, such as a browser, connected to a global communications network. This global network is of the Internet, Intranet or Extranet type, complying with the TCP/IP standard or the UDP/IP standard, and will be called "IP network" in the remainder of the disclosure. These functionalities are described particularly in documents WO9913418, U.S. Pat. Nos. 6,061,603 and 5,805,442. Data relating to the automation equipment is then formatted and sent by the WEB server, for example in the form of HTML or XML pages. It is also possible for a WEB server implanted in an automation equipment to be able to load a program, generally called an Applet, into a remote device, which program runs in the remote device so as to exchange with the WEB server of the automation equipment requests transported by the IP protocol.

By the term "remote device" will hereinafter be denoted either an individual computer, a portable telephone, a device of the Personal Digital Assistant (PDA) type or a computer server, such as an Applications Service Provider (ASP) applications server, a WEB server, a WAP server, a database management system (DBM) server, an integrated management package (IMP) server, an Enterprise Resource Planning (ERP) server, an Enterprise application integration (EAI) server, an electronic document management server, a Business-to-Business (B-to-B) e-commerce server or any other data processing system. By remote device may also be denoted a group of remote devices communicating with each other. A remote device comprises at least one processing unit, is capable of being connected to at least one automation equipment via an IP network and of running a computer program or a group of computer programs. Some automation equipments, such as conversational terminals, may be considered as remote devices.

The SOAP protocol is a protocol allowing information to be exchanged simply in a decentralised environment. It is based on the standardised eXtensible Markup Language (XML) and may be used in combination with several other WEB protocols such as Hyper Text Transfer Protocol (HTTP), Hyper Text Transfer Protocol/Secure Socket Layer (HTTPS or HTTP/SSL), Simple Mail Transfer Protocol (SMTP), File Transfer Protocol (FTP) and with the IP protocol. The SOAP protocol is based on XML diagrams and provides a vocabulary defining a communication request structure, content and syntax. This protocol is registered with the World Wide Web Consortium (W3C).

It would be particularly advantageous for the designer of an application in a remote device using development tools which are increasingly common in the WEB applications market, to be able to exchange data directly on an IP network with one or more automation equipments and to do this by means of the SOAP protocol. By adapting the automation equipment to protocols stemming from the data processing world, an automation equipment could communicate with a remote data processing application developed separately with development tools from the data processing world, without having to develop proprietary gateways or protocols, thus making the fields of automation equipments wide open to the world of the Internet.

To this end, the invention describes a communications system on an IP network between an automation equipment running a program to provide automation functions and one or more remote devices running a computer program or group of computer programs. The communications system is based on the Simple Object Access Protocol (SOAP) for the purpose of providing the remote device with supervision, display, control, configuration or programming functions of the automation equipment, and the communications system comprises, in the automation equipment, at least one WEB service or a WEB client which are capable of interacting with the automation equipment program, of decoding messages received from the IP network encoded according to the SOAP protocol and of encoding according to the SOAP protocol messages to be sent on the IP network.

The communications system may also comprise a service description document which describes the capacities of one or more WEB services implanted in an automation equipment, this service description document being accessible via a remote device either from its local resources, or from remote resources identified by a Uniform Resource Locator (URL), Universal Resource Identifier (URI) or Internet Protocol (IP) address. It may be stored in storage means located in the automation equipment or may be generated dynamically by the automation equipment; moreover it complies with a service description language referring to the SOAP protocol or the HTTP, HTTPS protocol and providing a grammar based on the extensible Markup Language (XML).

Given the expandable nature of the XML language, it will be possible for new elements to be added ensuring upward compatibility without previous developments being destabilised. Moreover, through the service description documents, unification of very different units will be achieved, by storing and making accessible to all "metadata" describing the services which they are capable of displaying.

Figure 2:
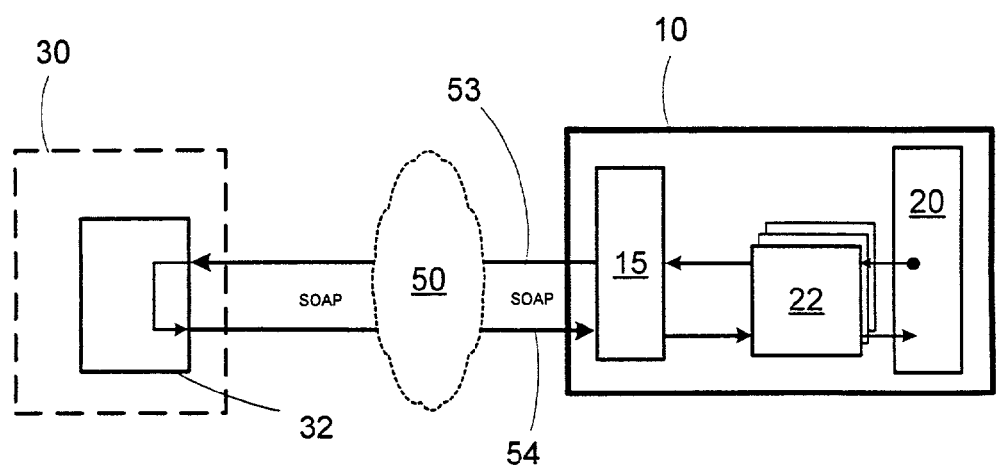
Figure 3:
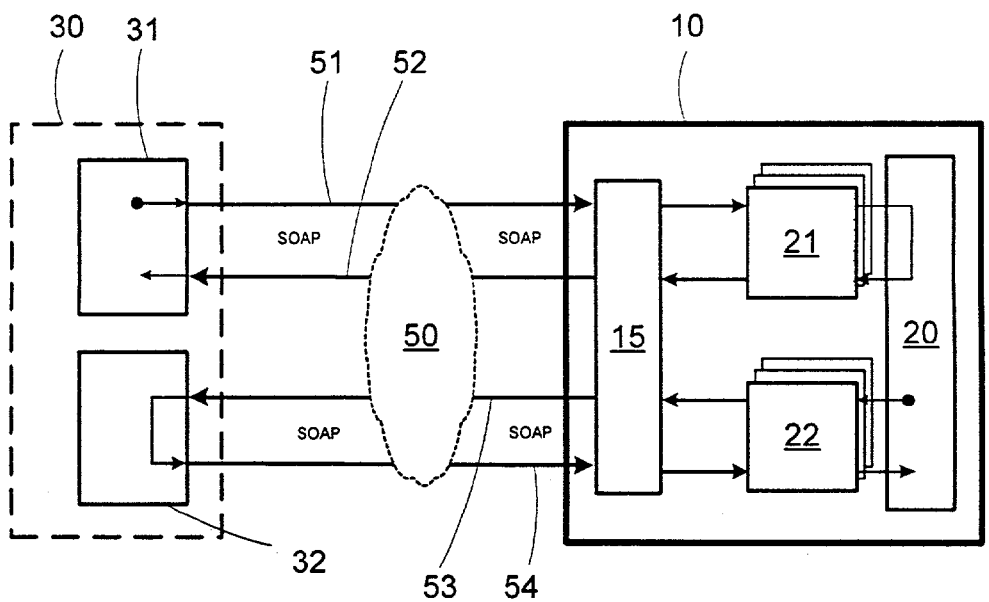
Figure 4:
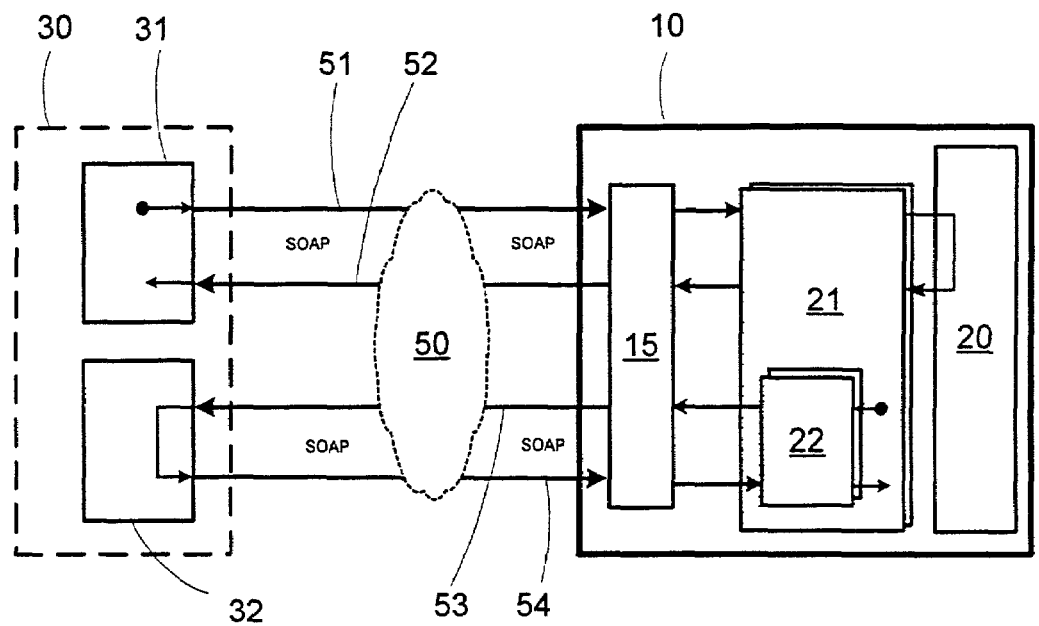
Figure 5:
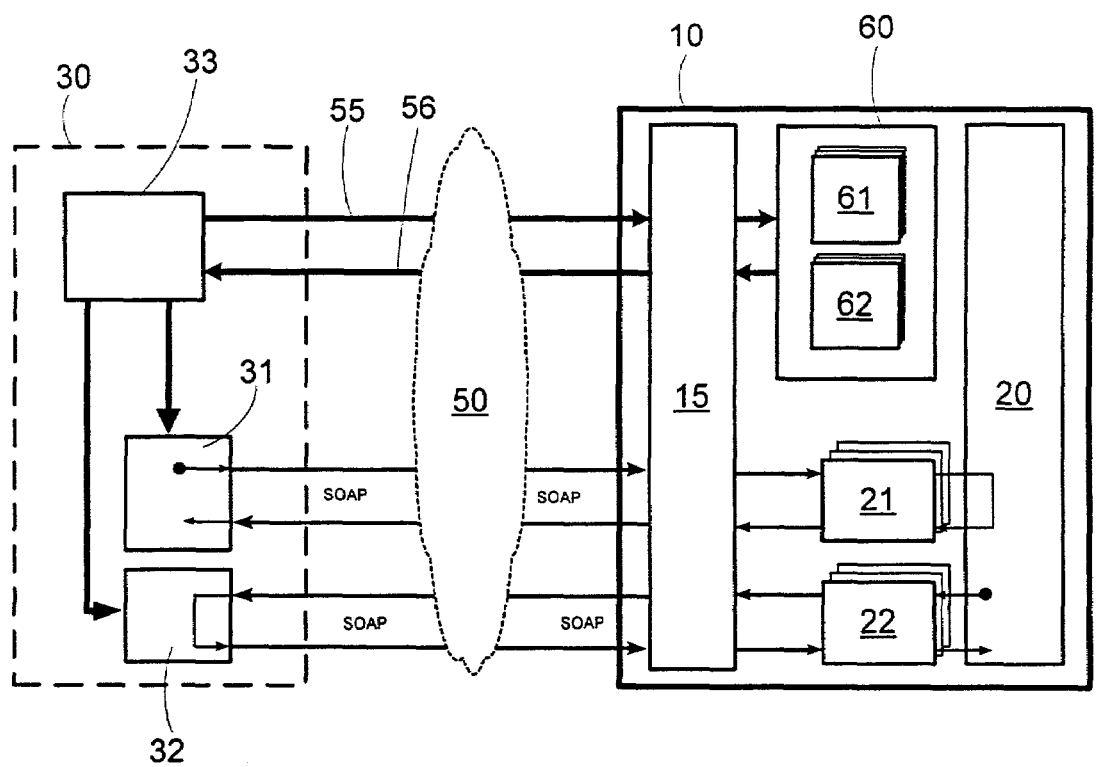
Figure 6:
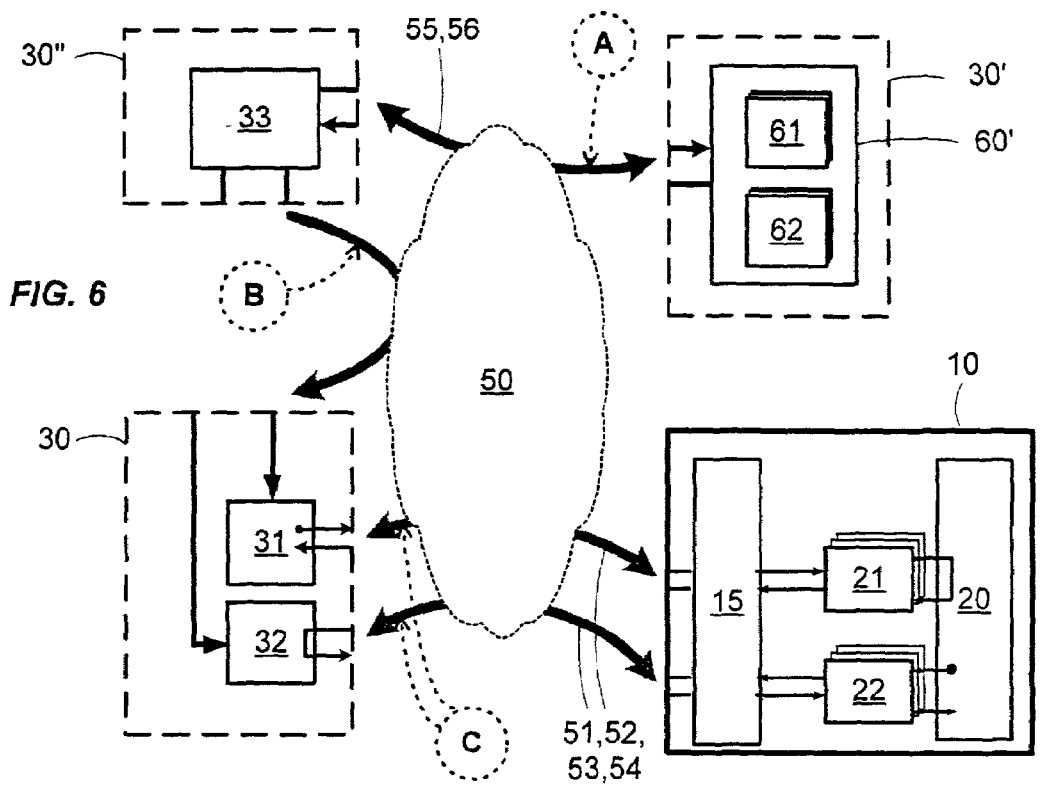
Figure 7:
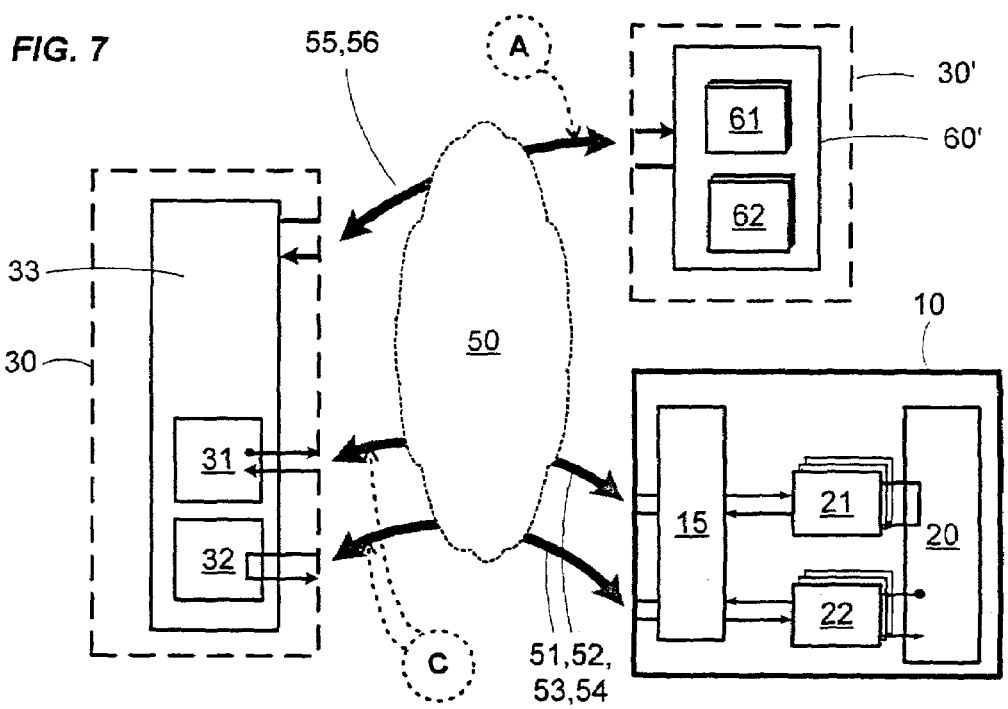

Other characteristics and advantages will emerge in the following detailed description referring to an embodiment which is given by way of example and represented by the appended drawings in which:

FIG. 1 shows a first example of a communication system according to the invention between an automation equipment including a WEB service and a remote client device, FIG. 2 shows a second example of a communication system between an automation equipment including a WEB client and a remote server device, FIG. 3 shows an example in which an automation equipment, communicating with a remote device both client and server, comprises a separate WEB client and WEB service, FIG. 4 repeats FIG. 3 with an automation equipment comprising a WEB client included in a WEB service, FIG. 5 shows an example of communication wherein an automation equipment provides a remote device with a service description document so as to be able to communicate with it, FIG. 6 shows in diagrammatic form the different stages of a process implementing the communication system according to the invention with in particular a service description document stored in a remote device different from the automation equipment, FIG. 7 shows a variant of the communication process in FIG. 6.

A WEB service is a resource accessible on the WEB, via a network interface, which accepts requests and sends back responses to these requests. This resource is described in formal terms by a software interface contained in a service description document. Implementing such a software interface in an automation equipment is called a "WEB service," in the present disclosure. A WEB client is a resource able to access the WEB, via a network interface, which sends requests and receives responses to these requests.

Referring to FIGS. 1 and 2, an automation equipment 10 is connected by an IP network 50 to a remote device 30. The automation equipment 10 comprises at least one processing unit capable of running a program 20 making it possible to offer one or more automatic control functions to an automatic control application. This program 20 may for example be an application or user program making it possible to make from the control of the automation equipment or directly the operating system of the automation equipment 10. The automation equipment 10 comprises at least one WEB service 21 and/or one WEB client 22 capable of interacting with the program 20 of the automation equipment. A remote device 30 comprises at least one processing unit capable of running a computer program or group of computer programs able to incorporate a plurality of client 31 and/or server 32 WEB applications.

FIG. 1 shows an automation equipment 10 communicating with a remote device 30 on an IP network 50. The remote device 30 runs a WEB client application 31 capable of sending on the IP network 50 requests 51 complying with the SOAP protocol. A SOAP request 51 is received by a WEB service 21 from the automation equipment 10 which decodes it, runs it and sends back a response 52 encoding it according to the SOAP protocol. The client application 31 is capable of receiving SOAP responses 52.

Symmetrically, FIG. 2 shows an automation equipment 10 communicating with a remote device 30 on an IP network 50. The automation equipment 10 includes a WEB client 22 capable of sending on the IP network 50 requests 53 encoded according to the SOAP protocol. A SOAP request 53 is received by a WEB server application 32 from the remote device 30 which decodes it, runs it and sends back a response 54 encoding it according to the SOAP protocol. The WEB client 22 is capable of receiving and decoding SOAP responses 54.

FIG. 3 shows an automation equipment 10 including both a WEB service 21 and a separate WEB client 22, which communicate with a WEB client application 31 and a WEB server application 32 of a remote device 30 respectively. The WEB client 31 and WEB server 32 applications may or may not belong to a same remote device 30 connected to the IP network 50 and comprising, for example, an Enterprise Resource Planning (ERP) application. In the variant shown in diagrammatic form in FIG. 4, the automation equipment 10 comprises a WEB client 22 which is included in a WEB service 21. For example, this WEB service 21 may incorporate a subscription functionality 51, 52 from which it is possible to send, initiated by the WEB service 21 or initiated by the automation equipment 10, a notification 53, 54 to at least one remote device 30, to inform the latter of events or states concerning the automation equipment 10.

The example below shows a request 51 complying with the SOAP protocol, sent by a WEB client application 31, to go read a "voltage" datum on a WEB service 21 of an automation equipment 10 named: "http://equipement-automatisme-1, schneider-electric.com/service-1", followed by a response 52 complying with the SOAP protocol, sent by the WEB service 21 of the automation equipment 10, returning the value "220" for the WEB client application 31.

SOAP message incorporated in the HTTP request 51:

```
POST /service-1 HTTP/1.1
Host: equipement-automatisme-1.schneider-electric.com
Content-Type:text/xml; charset="utf-8"
Content-Length: nnnn
SOAPAction: "Some-URI"
<SOAP-ENV: Envelope
   xmlns: SOAP-ENV="http://schemas.xmlsoap.org/soap/envelope/"
   SOAP-
ENV:encodingStyle="http://schemas.xmlsoap.org/soap/encoding/">
      <SOAP-ENV:Body>
         <m:Read xmlns:m="Some-URI">
            <Variable>Voltage</Variable>
         </m:Read>
      </SOAP-ENV:Body>
   </SOAP-ENV:Envelope>
      SOAP message incorporated in the HTTP request 52:
HTTP/1.1 200 OK
Content-Type: text/xml; charset="utf-8"
Content-Length: nnnn
<SOAP-ENV:Envelope
   xmlns:SOAP-ENV="http://schemas.xmlsoap.org/soap/envelope/"
   SOAP-
ENV:encodingStyle="http://schemas.xmlsoap.org/soap/encoding/">
      <SOAP-ENV:Body>
         <m:ReadResponse xmlns:m="Some-URI">
            <Data>220</Data>
         </m:ReadResponse>
      </SOAP-ENV:Body>
   </SOAP-ENV:Envelope>
```

To communicate on the IP network 50, the automation equipment 10 comprises a WEB network interface 15 of the HTTP, HTTPS, SMTP, FTP, TCP/IP or UDP/IP type. This network interface 15 is capable of routing messages 51, 54 coming from the IP network 50 to a WEB client 22 or to a WEB service 21 identified by a URL, URI or IP address, and of routing messages 52, 53 coming from a WEB service 21 or from a WEB client 22 of the automation equipment 10 to a URL, URI or IP address on the IP network 50.

According to another embodiment, it is also conceivable for a WEB client application 31 of a remote device 30 to send on the IP network 50 a request 51 of the HTTP, HTTPS type and not encoded according to the SOAP protocol, destined for a WEB service 21 of an automation equipment 10 identified by a URL, URI or IP address and for the WEB service 21 to respond on the IP network 50 by means of a response 52 encoded according to the SOAP protocol to a WEB client application 31. Such an HTTP, HTTPS request 51 may, for example, be a "GET" or "POST" request.

The data transmitted in requests 51, 53 and responses 52, 54 encoded according to the SOAP protocol may represent the implementation of communication protocols usually encountered between a data processing unit and an automation equipment. Among these usual protocols are found particularly the MMS, MODBUS and UNI-TE protocols.

The communication system may to advantage be based on a service description document 61 which describes the capacities of one or more WEB services 21 of an automation equipment 10, i.e. which describes the WEB services that an automation equipment 10 is in a position to provide or propose. Thus, by means of such a document 61 any remote device 30 is in a position to have permanent knowledge of what services are available in an automation equipment 10. A service description document 61 may also contain the description of several standard WEB services 21, corresponding for example to services systematically implanted in a whole fully identified range of automation equipments. Likewise, it may also contain a particular WEB service 21 available over a whole list of different automation equipments.

A service description document 61 specifies for each service a group of requests (request name, nature and name of parameters, request attributes) and the protocol or protocols to be used to call up the request in the automation equipment 10. If need be, this protocol or these protocols may be implied. The service description document 61 complies with a service description language referring to the SOAP protocol or to the HTTP, HTTPS protocol and providing a grammar based on the XML language or XML diagrams defined by the W3C. According to a preferred embodiment, it complies with the Service Description Language (SDL) specified by the Microsoft Corporation, with the SOAP Contract Language (SCL) specified by the Microsoft Corporation, with the Network Accessible Service Specification Language (NASSL) specified by the IBM Corporation or with the Web Services Description Language (WSDL) registered with the W3C Consortium. A service document 61 may contain one or more URL, URI or IP addresses marking one or more WEB services 21.

A WEB service 21 could also be described by several service description documents 61 each complying with a different service description language, so that a same automation equipment 10 may be accessible to different computer applications. Furthermore, a service description document 61 may be come compressed in a standard compression format for files and documents, such as ZIP or GZIP.

With reference to FIG. 5, a service description document 61 is stored in storage means 60 of an automation equipment 10, whereas in FIG. 6, it is localised in storage means 60' of a remote device 30'. These storage means 60, 60' may equally well be a file system on hard disk, CDROM, DVD, diskette, memory or any storage means. A service description document 61 is therefore accessible by a remote device 30 from remote addresses identified by a URL, URI or IP address, when it is in an automation equipment 10 or in another remote device 30'. But it is also conceivable for a service description document 61 to be accessible by a remote device 30 directly from its own local resources (for example by means of a CD-ROM drive).

In FIG. 5, a remote device 30 comprises a computer application 33, such as a software development tool or a browser, which is capable of sending on the IP network 50 a read request 55 complying with one of the WEB protocols (for example an HTTP request), to ask for a service description document 61 describing the services available in an automation equipment 10. This document is then sent back on the IP network 50 to the computer application 33 in a response 56. From these elements, the computer application 33 may:

display the content of the service description document 61 so that a designer can develop a WEB client application 31 and/or WEB server application 32 which will be capable of communicating with a WEB service 21 and/or a WEB client 22 of the automation equipment 10 respectively, via the SOAP protocol, use the content of the service description document 61 to construct and assemble all or part of a WEB client application 31 and/or a WEB server application 32, so as to relieve the developer of the client or server of the routine aspects of the application development (request construction, data transcoding, error management, etc.), in the event of it being constructed for that end, send SOAP requests directly to a WEB service 21 of the automation equipment 10 via an integrated WEB client application 31, and/or receive directly from a WEB client 22 of the automation equipment 10 SOAP requests via a WEB server application 32, as shown in FIG. 7.

One of the advantages of the present invention also lies in the fact that a service description document 61 describing the services of an automation equipment 10 may be constructed in different ways. It may be stored in storage means 60 of the automation equipment 10 or in storage means 60' of a remote device 30', but it may also be generated dynamically when a computer application 33 of a remote device 30 sends a request 55 to access the services available in the automation equipment 10. This functionality therefore makes it possible to develop the service description document 61, for example when the configuration of the automation equipment 10 is modified (connection or disconnection of a module in a programmable logic controller 10). Moreover, an automation equipment 10 may wish to display or conceal some WEB services depending on its state or depending on the remote device 30 which wants to communicate with it.

To this end, an automation equipment 10 may comprise a generator 62 which is a program capable of constructing dynamically a service description document 61. Preferentially, this dynamic construction is realised when a remote device 30 asks for access to the service description document 61 of the automation equipment 10. In this case, the service description document 61 does not need to be stored since it is drawn up dynamically at each request 55 sent by a computer application 33 to the generator 62. However, in some cases, it is also conceivable for there to be a dynamic construction of the document 61 initiated at the request of the automation equipment 10. Moreover, a mixed solution is also conceivable wherein a generator 62 would be capable of personalising dynamically a service description document 61, basing itself on a standard document already stored for a family of units, for example.

To obtain a service description document 61 in a response 56, a read request 55 therefore contains a URL, URI or IP address which marks either a generator 62 capable of constructing the service description document 61 dynamically or directly the service description document 61.

The generator 62 may equally well be stored in storage means 60 of the automation equipment 10, as shown in FIG. 5, or in storage means 60' of a remote device 30', as shown in FIG. 6. Furthermore, FIG. 6 shows a computer application 33 which is run in another remote device 301 different from the remote device 30 which contains the WEB applications 31, 32. Communications between the remote devices 30, 30', 30" take place on the IP network 50.

A communication process on the IP network 50 between an automation equipment 10 running a program 20 to provide automatic control functions and a remote device 30 running a computer program or group of computer programs is described in FIG. 6. This communication process is based on a communication system as previously described based on the Simple Object Access Protocol (SOAP) with the purpose of providing the remote device 30 with supervision, display, control, configuration or programming functions of the automation equipment 10. It comprises the following stages:

A service discovery stage A wherein a computer application 33, running in the remote device 30 or in another remote device 30", sends a read request 55 on the IP network 50 in order to receive, in a response 56, a service description document 61. The request 55 contains a URL, URI or IP address which marks either a service description document 61 already stored in the automation equipment 10 or in a remote device 30', or a generator 62 which then constructs a service description document 61 dynamically and sends it back in the response 56, A development stage B wherein, by means of the service description document 61, it is possible to develop manually or automatically, from the computer application 33, a WEB client application 31 and/or a WEB server application 32 in the remote device 30 so as to communicate with a WEB service 21 and/or a WEB client 22 of the automation equipment 10 respectively, via the SOAP protocol, A communication stage C between a WEB client application 31 and/or a WEB server application 32 of the remote device 30 and a WEB service 21 and/or a WEB client 22 of the automation equipment 10, by means of requests 51, 53 and responses 52, 54 complying with the SOAP protocol.

According to a variant shown in FIG. 7, the computer application 33, which in this case may for example be a browser, is structured so as to incorporate within itself a WEB client application 31 and/or a WEB server application 32. Stage B of the process is then not necessary since the computer application 33 may send SOAP requests directly to a WEB service 21 and/or a WEB client 22 of the automation equipment 10, as soon as it is in possession of the service description document 61, without needing development. The communication process then comprises a service discovery stage A then directly a communication stage C.

It is fully understood that it is possible, without departing from the framework of the invention, to imagine other variants and refinements of detail and even to conceive the use of equivalent means.

The invention claimed is:

1. A communication system on an IP network between an automation equipment comprising:
    at least one processing unit capable of running a program to provide automation functions; and
    one or more remote devices running a computer program or group of computer programs,
    wherein the communications system is based on the Simple Object Access Protocol (SOAP) for the purpose of providing the remote device with supervision, display, control, configuration or programming functions of the automation equipment, and the communications system comprises, in the automation equipment, at least one WEB service one WEB client which are capable of interacting with the program of the automation equipment, of decoding messages received from the IP network encoded according to the SOAP protocol and of encoding according to the SOAP protocol messages to be sent on the IP network.

2. A communication system according to claim 1, wherein the automation equipment includes at least one WEB service able to receive from the IP network requests, coming from at least one WEB client application contained in a remote device and of sending on the IP network responses to the WEB client application of the remote device.

3. A communication system according to claim 1, wherein the automation equipment includes at least one WEB client able to send on the IP network requests to at least one WEB server application contained in a remote device and of receiving from the IP network responses, coming from the WEB server application of the remote device.

4. A communication system according to claim 2, further wherein a service description document describes the capacities of one or more WEB services implanted in the automation equipment, this service description document being accessible by the a remote device either from its local resources, or from remote resources identified by a URL, URI or IP address.

5. A communication system according to claim 4, wherein the service description document complies with a service description language referring to the SOAP protocol or to the HTTP, HTTPS protocol and providing a grammar based on the eXtensible Markup Language (XML).

6. A communication system according to claim 5, wherein the service description document may contain one or more URL, URI or IP addresses of one or more WEB services.

7. A communication system according to claim 6, wherein the service description document complies with the Service Description Language (SDL).

8. A communication system according to claim 6, wherein the service description document complies with the SOAP Contract Language (SCL).

9. A communication system according to claim 6, wherein the service description document complies with the Network Accessible Service Specification Language (NASSL).

10. A communication system according to claim 6, wherein the service description document complies with the Web Services Description Language (WSDL).

11. A communication system according to claim 6, wherein several service description documents complying with different service description languages can describe the capacities of a same WEB service 12. A communication system according to claim 11, wherein the service description document is compressed in a standard compression format for files and documents.

13. A communication system according to claim 11, wherein the service description document of an automation equipment is stored in storage means located in the automation equipment.

14. A communication system according to claim 11, wherein the service description document of an automation equipment is stored in storage means located in a remote device.

15. A communication system according to claim 11, wherein a generator is capable, following a request emanating from a remote device, of constructing a service description document dynamically, describing the capacities of one or more WEB services implanted in an automation equipment.

16. A communication system according to claim 15, wherein the generator of a service description document of an automation equipment is accessible, for a remote device, via a URL, URI or IP address.

17. A communication system according to claim 16, wherein the generator of a service description document of an automation equipment is stored in storage means located in the automation equipment or in storage means located in a remote device.

18. A communication process on an IP network between an automation equipment running a program to provide automatic control functions and a remote device running a computer program or group of computer programs, the purpose of the communication process being to provide the remote device with supervision, display, control, configuration or programming functions of the automation equipment, the communication process is based on a communications system based on the SOAP protocol and comprising;
  running a computer application in the remote device or in another remote device;
  sending from the application a read request on the IP network in order to receive, in a response, a service description document,
  developing, manually or automatically, by means of the service description document, all or part of a WEB client application and/or a WEB server application in the remote device so as to be able to communicate with a WEB service and/or a WEB client of the automation equipment respectively,
  communicating between a WEB client application and/or a WEB server application of the remote device and a WEB service and/or a WEB client of the automation equipment on the IP network, by means of requests and responses complying with the SOAP protocol.

19. A communication process on an IP network between an automation equipment running a program to provide automatic control functions and a remote device running a computer program or group of computer programs, the purpose of the communication process being to provide the remote device with supervision, display, control, configuration or programming functions of the automation equipment, the communication process is based on a communications system based on the SOAP protocol and comprising:
  running a computer application in the remote device;
  sending from the application a read request on the IP network in order to receive, in a response (6.6), a service description document,
  communicating between a WEB client application and/or a WEB server application included in the computer application of the remote device and a WEB service and/or a WEB client of the automation equipment on the IP network, by means of requests and responses complying with the SOAP protocol.

20. A communication process according to one of claims 18 or 19, wherein the request contains a URL, URI or IP address which marks either a service description document, or a generator capable of constructing a service description document dynamically.

* * * * *